United States Patent [19]

Ohigashi et al.

[11] Patent Number: 4,965,597

[45] Date of Patent: Oct. 23, 1990

[54] COLOR IMAGE RECORDING APPARATUS

[75] Inventors: Chiaki Ohigashi, Yokohama; Shigeru Iemura, Kawasaki; Kazuhiro Shimamura, Tokyo; Tetsuo Tanaka, Yokohama, all of Japan

[73] Assignee: Matsushita Graphic Communication Systems, Inc., Tokyo, Japan

[21] Appl. No.: 83,828

[22] Filed: Aug. 11, 1987

[30] Foreign Application Priority Data

Aug. 21, 1986 [JP] Japan .................. 61-196174

[51] Int. Cl.⁵ .............. G03G 15/01; G01D 15/06
[52] U.S. Cl. .................. 346/157; 355/327; 358/75
[58] Field of Search ........... 355/3 R, 4, 40, 200, 355/210, 326, 327; 346/153.1, 157, 160; 358/75, 78

[56] References Cited

U.S. PATENT DOCUMENTS

| | | |
|---|---|---|
| 4,007,489 | 2/1977 | Helmberger et al. ............... 358/78 |
| 4,401,024 | 8/1983 | Frentress ........................ 346/157 X |
| 4,485,982 | 12/1984 | St. John et al. ................. 242/57.1 |
| 4,569,584 | 2/1986 | St. John et al. ................. 355/14 R |
| 4,721,969 | 1/1988 | Asano ........................... 346/157 |
| 4,731,622 | 3/1988 | Hicks et al. .................... 346/157 |

FOREIGN PATENT DOCUMENTS 57-122455 7/1982 Japan .
57-124753 8/1982 Japan .

Primary Examiner—Fred L. Braun
Attorney, Agent, or Firm—Wenderoth, Lind & Ponack

[57] ABSTRACT

A color image recording apparatus superimposes a plurality of images having different colors to form a composite color image on a recording medium. Registration marks are formed on the recording medium at equal pitches as it is transported through an image formation device included in the apparatus. The apparatus also includes a sensor for sensing the registration marks and an edge sensor for sensing one edge or both edges of the recording medium.

18 Claims, 14 Drawing Sheets

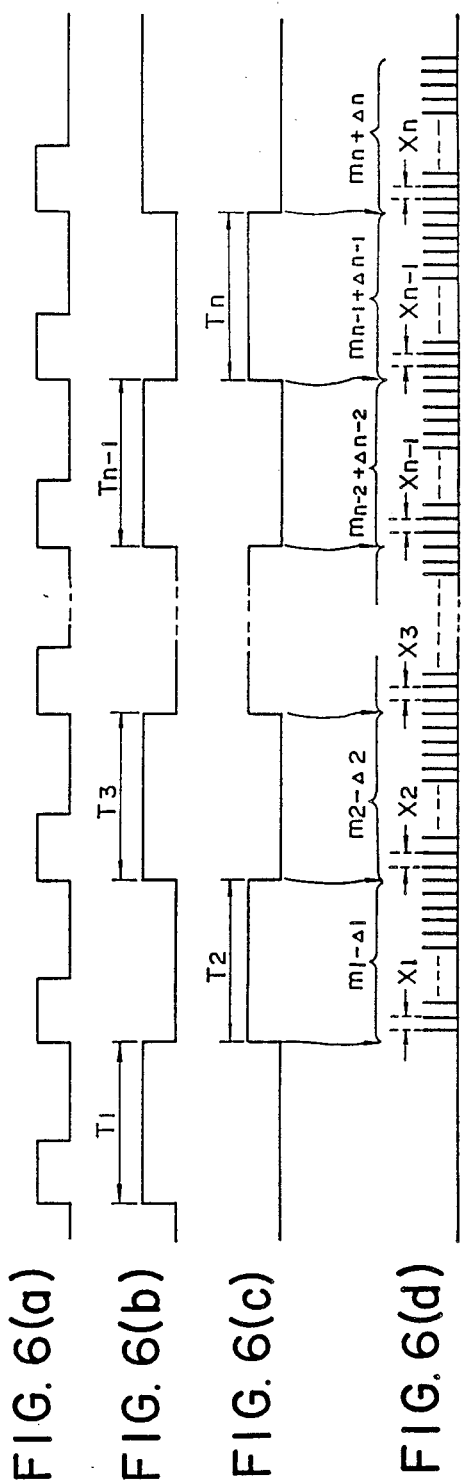

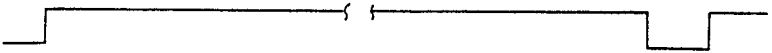
FIG. 13(a)
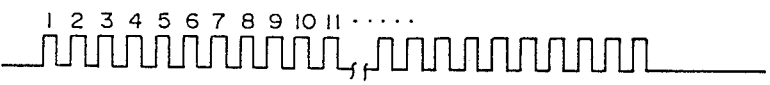
FIG. 13(b)
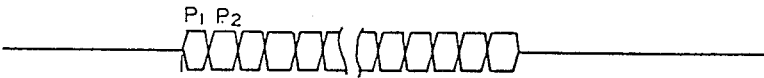
FIG. 13(c)
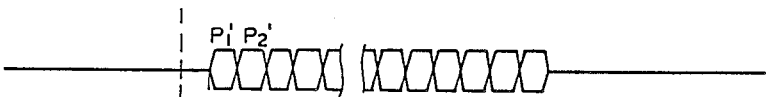
FIG. 13(d)
FIG. 13(e)
FIG. 13(f)
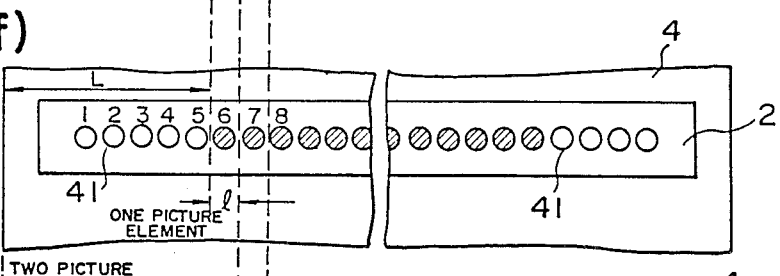
FIG. 13(g)
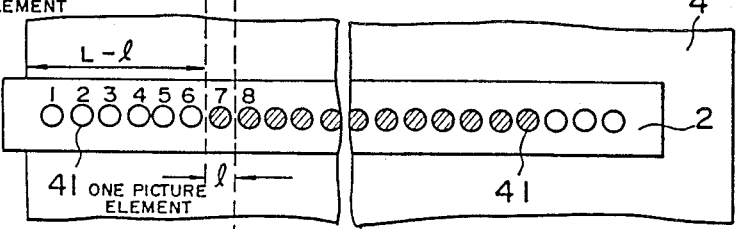
FIG. 13(h)
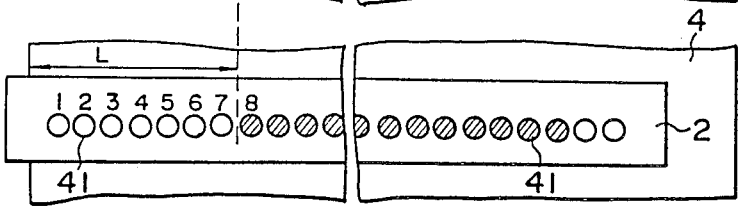

COLOR IMAGE RECORDING APPARATUS

BACKGROUND OF THE INVENTION

1. Field of the Invention

The present invention relates to the art of electrophotographic recording system and more particularly to an apparatus forming electrostatic latent images on a recording medium according to information received in an electronic signal and developing the images one by one with a plurality of color developing devices so that the images are superimposed one upon another and a composite color image is produced on the recording medium.

2. Description of the Related Art

In recent years, with the development of color plotter systems and printers, there have been increasing demands for providing picture images in color printing being as fine as those in color photography.

There have been known monocolor electrophotographic recording and multicolor electrophotographic recording as the recording methods of recording color images. In the monocolor recording, development is made immediately after a latent image is formed. In the multicolor recording, however, two or more latent images must be superposed independently. Therefore, in order for the different color component images to be correctly superposed so as not to produce color fringes and color registration errors and thereby to assure the production of a high resolution color print, there must be provided some means for registration.

The problem of registration of color images and means for solving the problem are stated and proposed in U.S. Pat. No. 4,007,489. In this patent, a series of recording/developing stations are provided, each station having one recording head and one developing device for each color. The registration of the component images is achieved by means of a cross mark for printing placed on the surface of the recording medium, which is adapted to be sensed by a series of sensors before each recording/developing station. However, the use of a single registration mark and multiple recording stations has several disadvantages. That is, due to differences of time setting for the latent images formed and of physical parameters of the different recording head structure, displacement of the recording medium is easily produced in both longitudinal and lateral directions of the recording medium. And, as the recording medium moves within the system from station to station, position of the recording medium readily changes. Furthermore, the recording medium changes in size, that is, produces expansion or shrinkage in both lateral and longitudinal directions with reference to the length. Such expansion or shrinkage is sufficient to result in lower resolution of the composite image due to color fringes and color registration errors and to result in misalignment of the component images.

As a solution to the above mentioned problems, there is known an art as described in U.S. Pat. No. 4,569,584. The apparatus of this patent is provided with a recording station including recording electrode means for forming latent images on a recording medium and a plurality of developing means disposed adjoining either one side or both sides of the recording station, each developing means including a color developing device for forming a color component image to constitute a composite image.

According to this patent, the recording medium is transported within the apparatus in opposite directions. The direction reversal of the recording medium is made at least once after a first component latent image has been formed by the recording head and its color component image has been developed, so that a second component latent image may be formed superimposed on the thus developed first component image, and this color component image is then developed. The process may be repeated the same number of times as the number of desired color component images.

Furthermore, according to the description in this U.S. Pat. No. 4,569,584, registration means associated with transport of the recording medium and formation of each of the component images is provided therein so that the component images of various colors are superimposed on one another with sufficient accuracy.

The registration means includes recording means within the recording station to form aligned latent tracking indexes, which are subsequently developed to be visualized, on the recording medium outside the field of the composite color image. The tracking indexes may be printed on the recording medium when it is manufactured, but this considerably increases the cost of the recording media as consumables and is not preferable from the viewpoint of cost effectiveness.

As means associated with the transport of the recording medium, two kinds of photoelectric sensors are used to sense the aligned tracking indexes to provide electrical signals representative of information about dimensions of the recording medium in both the longitudinal and lateral directions, and thereby, adjustment of the component latent image in both the longitudinal and lateral directions is made achievable.

While the component latent image is being formed, relative translation between the recording medium and the recording head is provided. This is achievable in several ways. First, the supply roll from which the recording medium is let out into the electrophotographic apparatus etc. is laterally translated with reference to the medium path within the apparatus. Second, the recording head including the electrode means is laterally translated relative to the recording medium. Third, the recording head is rotated with reference to the path of the recording medium within the apparatus. Further, the traveling speed of the recording medium along its path is controlled, or the frequency for energizing the electrode means is controlled, based upon the sensed information, so that more data lines or less data lines may be included in the component latent image formed.

The tracking indexes comprise a series of aligned registration marks having the same spacing and width and disposed adjoining one edge or both edges of the recording medium. The registration marks are preceded by a plurality of aligned initializing marks in a particular recording medium portion, which have a different geometric shape from the registration marks, for example, a different mark width. The point of change from the last narrower initializing mark to the first wider registration mark is indicative of the starting location, termed START PLOT, for each component latent image.

Lateral and longitudinal demensional changes in the medium derived from observation of an aligned row of registration marks is indicative of changes in length, either expansion or shrinkage, of the recording medium section under observation. In this regard, coarse correction for lateral alignment of the recording medium relative to the recording head due to medium shifting in the medium path can be accomplished by the lateral translation of the medium supply roll, while fine correction for lateral latent image alignment due to medium expansion or shrinkage can be accomplished by the lateral translation of the recording head to recenter the head relative to the medium, or by the lateral shifting of the energization of the electrode means, i.e., the lateral start point of the latent image formation, as described in U.S. Pat. No. 4,007,489.

Alternatively, a tracking line adjacent to and parallel with the aligned row of registration marks at both edges of the recording medium may be employed for lateral head corrective translation.

However, the color image recording apparatus structured as above has disadvantages. Since there are provided a series of registration marks and tracking lines along both edges of the recording medium, the portion where an image is practically unable to be recorded becomes larger. Furthermore, since the registration in the direction of transport of the recording medium is controlled by the recording timing provided based on measurement of the pitch of the registration marks, such errors that are produced while the recording medium is transport, e.g., slippage of the transport roller, will produce a displacement that remains in the recorded image throughout the subsequent recording process and as such will cause color registration errors when a plurality of colors are superimposed. Still furthermore, since the alignment in the direction perpendicular to the direction of transport of the recording medium is accomplished such that the tracking lines on the left and right are respectively watched by two optical sensors and the control is made so that the outputs of both of the optical sensors may be balanced, if there is a broken portion or uneven density in the tracking line, the position of the image will be shifted in spite of there being no meandering movement or expansion or shrinkage of the recording medium, and thereby, color registration errors will be produced. There were such problems in the prior art.

SUMMARY OF THE INVENTION

The primary object of the present invention is the provision of a color image recording apparatus with which the recording medium will be effectively utilized and which will achieve correct color registration even if transport errors are produced while the recording medium is transported.

To be more specific, the object of the present invention is the provision of a color image recording apparatus which will measure each pitch between registration marks and make compensation, for each interval between the registration marks, for a discrepancy between the measured value and the number of lines which were assumed when the registration marks were formed.

Another object of the present invention is the provision of a color image recording apparatus which will sense the edge of the recording medium for correct alignment of the recording medium in the direction perpendicular to the direction of transport.

BRIEF DESCRIPTION OF THE DRAWINGS

Other objects and advantages than those mentioned above of the present invention will become fully understood from the description given below with reference to the accompanying drawings, in which:

FIG. 6(a) is a waveform diagram of the output of the mark sensor. FIG. 6(b) is a waveform diagram of the Q terminal of the flip-flop. FIG. 6(c) is a waveform diagram of the Q terminal of the flip-flop. FIG. 6(d) shows the recording timing signal output from the OR circuit.

FIG. 13 (a) shows a picture-signal period signal according to a third embodiment of the present invention. FIG. 13 (b) shows a picture clock signal. FIGS. 13 (c), (d) and (e) show the picture signals relative to the clock signals. FIGS. 13 (f), (g) and (h) show positional relationships between the recording head and the electrostatic paper.

DETAILED DESCRIPTION OF THE PREFERRED EMBODIMENTS

Preferred embodiment of the present invention will be described below.

Figure 1:
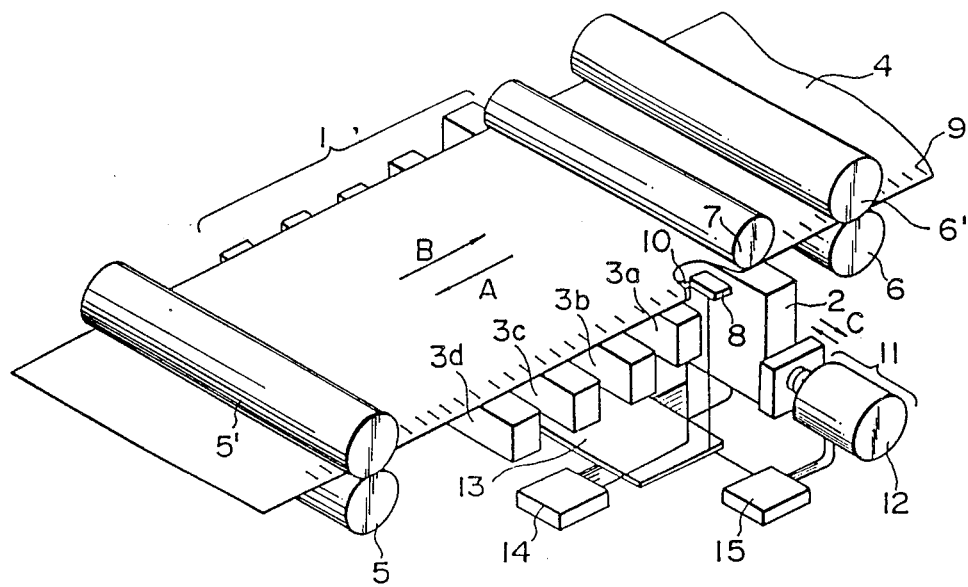
FIG. 1 is a drawing schematically showing structure of a color image recording apparatus according to a first embodiment of the present invention.

FIG. 1 is a drawing schematically showing a color image recording apparatus according to a first embodiment of the present invention. Referring to FIG. 1, reference numeral 1 denotes a recording portion, 2 denotes an electrostatic recording head, 3a, 3b, 3c, and 3d denote liquid developing devices to be supplied with liquid developing agents of black, cyan, magenta, and yellow colors, respectively, and individually set in the developing position. Reference numeral 4 denotes electrostatic recording paper to be pressed by a pressure roller 7 against the recording head 2 and transported by transport rollers 5, 6 and their pinch rollers 5', 6' in the direction indicated by the arrows A or B in the drawing through the recording portion 1. Reference numeral 8 denotes an edge sensor 8 provided with a line image sensor for sensing the edge of the electrostatic recording paper 4, reference numeral 9 denotes registration marks provided on the electrostatic recording paper 4 along its edge (for convenience' sake, they are drawn on the upper surface of the electrostatic recording paper 4 in the drawing). Reference numeral 10 denotes a mark sensor for sensing the registration marks 9 passing by the same. Reference numeral 11 denotes a recording head translation device which controls a pulse motor 12 for translating the recording head 2 in the directions indicated by the arrows C in the drawing. Reference numeral 13 denotes a driving circuit for applying the recording head 2 with high tension pulses, 14 denotes a recording head control circuit based on the measured value of the distance between the registration marks 9 obtained by the mark sensor 10 for generating the period of a recording timing, and 15 denotes a translation control circuit for detecting meandering movement of the electrostatic recording paper 4 in response to a sensed signal by the line image sensor 8 and thereby for controlling the recording head translation device.

Operation of the color image recording apparatus with the above described structure will now be described.

Prior to the picture image recording, the electrostatic recording paper 4 is first transported by the transport rollers 5, 6 in the direction as indicated by the arrow A in the drawing and the same is provided with latent images of the registration marks 9 along its one edge as it passes through the recording portion 1 and, in succession thereto, the latent images are developed by the liquid developing device 3a supplied with the liquid developing agent of black color. After the formation of the registration marks 9 has been finished, the electrostatic recording paper 4 is transported by the transport rollers 5, 6 in the direction as indicated by the arrow B in the drawing and thereby sent back to the original position. Thereafter, the liquid developing device 3a for black color is set in the developing position again so that a black picture image will be recorded. As the electrostatic recording paper 4 is transported by the transport rollers 5, 6 in the direction indicated by the arrow A in the drawing, the registration marks 9 are sensed by the mark sensor 10.

Figure 2:
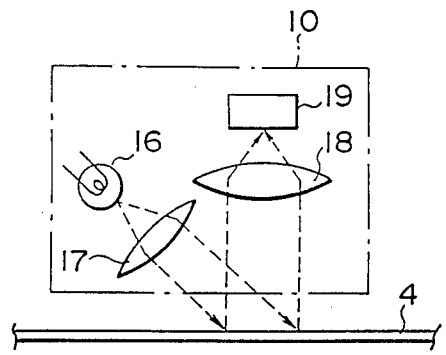
FIG. 2 is a drawing showing structure of a mark sensor used in the above mentioned embodiment.

The mark sensor 10 is structured as shown in FIG. 2 a beam of light from a light source 16 is condensed by a lens 17 so as to illuminate the surface of the electrostatic recording paper 4.

Figure 3:
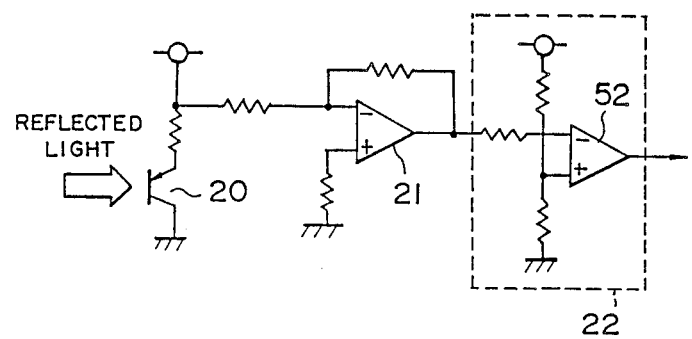
FIG. 3 is a diagram showing structure of a photosensor used in the mark sensor.

The reflected light from the surface of the electrostatic recording paper 4 is condensed by a condenser lens 18 and introduced into the light receiver surface of a photosensor 19. The photosensor 19 is formed, as shown in FIG. 3, of a phototransistor 20 for photoelectric conversion, an operational amplifier 21 for amplifying the output voltage of the phototransistor 20, and a comparator circuit 22 made up of an operational amplifier 52 for converting the output voltage of the operational amplifier 21 into a binary digital signal (brought to the low level when the registration mark 9 is sensed and turned to the high level when it is not sensed).

When the mark sensor 10 is not sensing the registration mark 9, the reflected light from the electrostatic recording paper 4 is introduced into the photosensor 19, whereby the phototransistor 20 is turned on causing the output of the operational amplifier 21 to become 0 V, so that the output of the comparator circuit 22 is also brought to the low level. When the mark sensor 10 senses the registration mark 9, no reflected light is introduced into the photosensor 19 whereby the phototransistor 20 is turned off. Consequently, a higher voltage than the reference voltage of the comparator circuit 22 appears at the output side of the operational amplifier 21, and so the output of the comparator circuit 22 is brought to the high level.

Figure 4A:
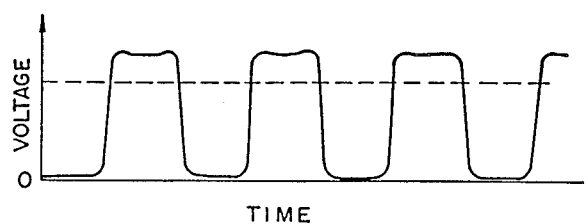
FIG. 4(a) is a waveform diagram of the operational amplifier.
Figure 4B:
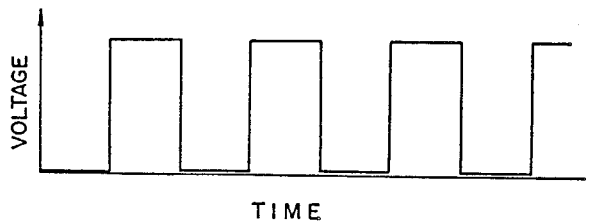
FIG. 4(b) is a waveform diagram of the above mentioned photosensor.

The waveforms of the outputs of the operational amplifier 21 and the comparator circuit 22 at the times when the registration marks 9 on the electrostatic recording paper 4 transported by the transport rollers 5, 6 are sensed by the mark sensor 10 are shown in FIGS. 4 (a) and (b), respectively. The sensed signal of the registration mark 9 by the mark sensor 10 is sent to the recording head control circuit 14, and when the first registration mark 9 is sensed, the image recording and registration control are started.

The method for sensing the registration marks 9 for making registration in the direction of transport of the electrostatic recording paper 4 will be described below with reference to FIGS. 5 and 6.

Figure 5:
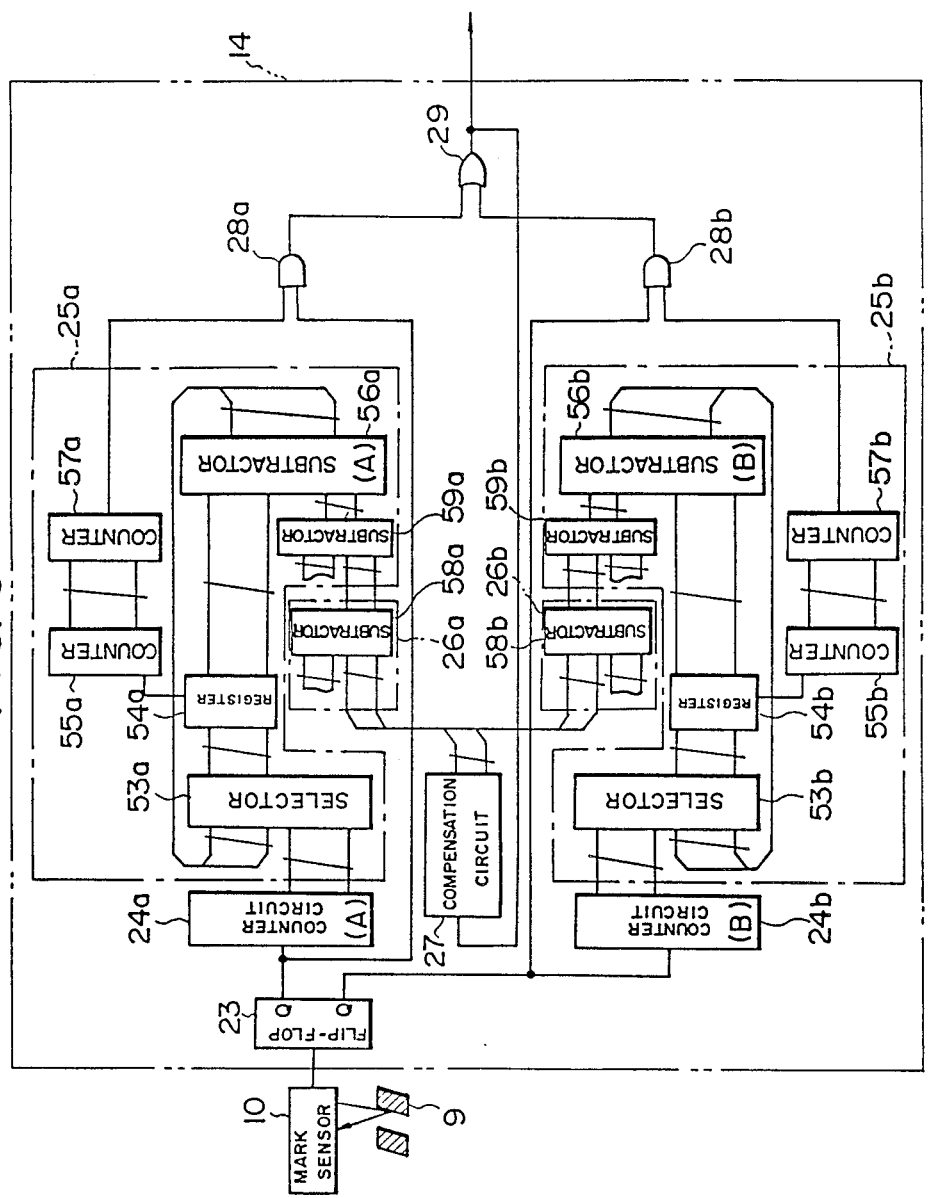
FIG. 5 is a block diagram showing a recording head control circuit.

Referring to FIG. 5, 23 denotes a flip-flop having a Q terminal and a $\overline{Q}$ terminal as the output terminals, 24a and 24b denote counter circuits (A) and (B) for measuring the distances between the registration marks 9, 25a and 25b denote division circuits (A) and (B) for calculating the period of a recording timing signal, 26a and 26b are compensation circuits (A) and (B), 27 denotes a trigger counter circuit for counting number of pulses of the recording timing signal, 28a and 28b denote AND circuits, and 29 denotes an OR circuit.

If a sensed signal of the registration marks 9 as indicated in FIG. 6 (a) is given to the flip-flop 23, the Q and $\overline{Q}$ terminals of the flip-flop 23 alternately output 1 and 0 every time the edge of the registration marks 9 is sensed. The Q and $\overline{Q}$ terminals of the flip-flop 23 are connected with the count enable terminals of the counter circuit (A) 24a and the counter circuit (B) 24b, respectively, whereby the distances between the edges of the registration marks 9 are measured. That is, when the edge of the first registration mark 9 is sensed, the output Q of the flip-flop 23 becomes 1 and the distance therefrom to the edge of the next registration mark 9 is measured by the counter circuit (A) 24a.

Within the division circuit (A) 25a, the measured value by the counter circuit (A) 24a is first set in a register 54a through a selector 53a, and, as a clock (not shown in the drawing) is provided, a predetermined value is subtracted therefrom by a subtractor (A) 56a and the result is again supplied to the register 54a through the selector 53a. This operation is repeated until the output of the subtractor (A) 56a becomes negative, when, the times of repeated subtractions, which is counted by the counter 55a, provides the quotient as the result of the division. The quotient is set in a counter 57a as a preset value. This counter 57a generates a recording trigger signal according to the present value. This recording trigger signal is gated by the AND circuit 28a and continued to be output from when the second registration mark 9 has been sensed till when the third registration mark 9 is sensed. When the edge of the second registration mark 9 is detected, the output Q of the flip-flop 23 becomes 0 and the output $\bar{Q}$ thereof becomes 1, and the counter circuit (B) 24b measures the distance from the edge of this registration mark 9 to the edge of the third registration mark 9. The measured value is subjected to division similar to that described above by the division circuit (B) 25b, whereby a recording timing signal is generated.

This recording trigger is continuously output from the time the edge of the third registration mark 9 has been sensed to the time the edge of the fourth registration mark 9 is sensed.

In the described manner, the edge-to-edge distances of the registration marks 9 are alternately measured by the two sets of counter circuits 24a and 24b and recording timing signals are generated from the measured values through calculations by the division circuit (A) 25a and the division circuit (B) 25b, whereby the periods of the line recording timing signals for the recording head control circuit 14 are determined.

The trigger counter circuit 27 counts the number of pulses of the recording timing signal, and thereby counts the number of recorded lines. Every time the edge of the registration mark 9 is sensed by the mark sensor 10, the difference between the above actually recorded number of record lines and the number of lines previously assumed when the registration marks 9 were recorded is calculated by the compensation circuit (A) 26a made up of a subtractor 58a or (B) 26b made up of a subtractor 58b. In case the number of lines already recorded is smaller than the assumed number of lines, the quotient in the division circuit 25a, 25b is provided with a compensation so that such a recording timing signal may be generated as to allow extra recording of lines of the same number as was deficient to be made during the period until the next registration mark 9 is sensed, whereby the number of recorded lines at the timing the next registration mark 9 is sensed will agree with the total number of record lines assumed at the time the registration marks 9 were recorded. Also, in case the number of lines already recorded is larger than the assumed number of lines, the compensation circuit (A) 26a, (B) 26b likewise provides the division circuit (A) 25a, (B) 25b with a compensation so that both of the total record lines agree with each other at the timing the edge of the next registration mark 9 is sensed.

The above described operations will be described in more detail also referring to FIG. 6 in the following.

Referring to FIG. 6, (a) shows the output of the mark sensor 10 and (b) and (c) show output waveforms of the terminals Q and $\bar{Q}$ of the flip-flop 23, respectively. The edge-to-edge distances of the registration marks 9 are measured by the counter circuit (A) 24a and the counter circuit (B) 24b, to which the Q and $\bar{Q}$ terminals of the flip-flop 23 are connected, as $T_1, T_2, T_3, \ldots, T_{n-1}, T_n$. FIG. 6 (d) shows the recording timing signal output from the OR circuit 29 shown in FIG. 5. As previously mentioned, it is assumed that a record of m lines is to be made within each of the distances between the registration marks 9.

Now, the first distance between the registration marks 9, i.e., the distance between the first and second registration marks 9 is $T_1$ and there has not yet been any record within this interval, and so, the count value in the trigger counter circuit 27 is 0. Therefore, the compensation value 0 is set in the subtractor 58a of the compensation circuit (A) 26a and m −0 is provided by calculation by the subtractor circuit 59a of the division circuit (A) 25a, whereby the number of lines to be recorded within the next distance between the registration marks 9 is determined to be $m-0=m_1$, which is set in the subtractor (A) 56a as its divisor, and the division $$T_1/m_1 = \tau_1$$

is operated by the division circuit, e.g., the division circuit (A) 25a. Then, throughout the time that the second distance between registration marks 9 is measured by the counter circuit (A) 24a, the recording timing signal whose period is $\tau_1$ is output, and at the same time, the number of pulses is counted by the trigger counter circuit 27. Then, while the second distance between registration marks 9 is $T_2$, the count value may be $$m_1 + \Delta_1,$$

where $m_1 + \Delta_1 \leq T_2/\tau_1 < m_T + \Delta_1 + 1$. And so, $(m_1 + \Delta_1) - m = \Delta_1$ is calculated by the subtractor 58b of the compensation circuit (B) 26b, and thereby, the discrepancy $\Delta_1$ of the measured value from the number of lines which is to be rightfully recorded till the third registration mark 9 is detected. Thus, the number of lines to be recorded within the next distance between registration marks 9, i.e., $$m - \Delta_1 = m_2$$

is set by the subtractor 59b of the division circuit (B) 25b as the divisor for the subtractor (B) 56b, and operation for $$T_2/m_2 = \tau_2$$

is performed by the division circuit (B) 25b to provide the pulse period $\tau_2$ of the recording timing signal which will allow the number of lines recorded until the edge of the fourth registration mark 9 to become $$m + \Delta_1 + m_2 = 2m.$$

The recording timing signal with the pulse period $\tau_2$ is delivered out of the recording head control circuit 14 throughout the time $T_3$ that the third distance between registration marks 9 is measured. When the time $T_3$ has been measured by the counter circuit (A) 24a, the trigger counter circuit 27 may count $$m_2 + \Delta_2$$

where $m_2 + \Delta_2 \leq T_2/\tau_2 < m_2 + \Delta_2 + 1$, and in the same way as above, the discrepancy $\Delta_2$ is detected by the compensation circuit (A) 26a and the number of lines to be recorded in the next distance between the registration marks 9 is set as $$m - \Delta_2 = m_3,$$

and division for $$T_3/m_3 = \tau_3$$

is operated by the division circuit (A) 25a.

The above described controlling is performed until a monocolor image recording has been finished with the registration marks 9 constantly detected throughout the process.

Figure 7A:
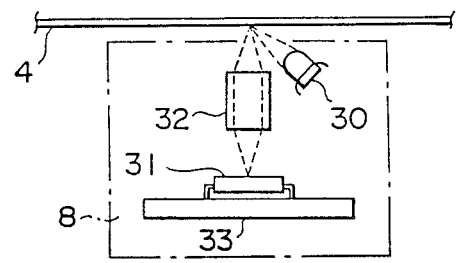
FIGS. 7 (a) and (b) are drawings showing structures of an edge sensor.

The edge sensor 8 is provided so as to sense one edge of the electrostatic recording paper 4 while the registration marks 9 are sensed and thereby the registration in the direction of transport of the electrostatic recording paper 4 is conducted. The same comprises, as shown in FIG. 7 (a), an LED light source 30, a line image sensor 31 formed of an array of linear photosensor elements packed to the density equal to or higher than the density of the picture elements for receiving the light of the LED light source 30 reflected by the electrostatic recording paper 4, a rod lens array 32 for condensing the light from the electrostatic recording paper 4 onto the image sensor 31, and an amplifier circuit 33 for taking out signals from each of the photosensors of the line image sensor 31 and outputting the same as a serial bit signal.

FIG. 8 shows an example of the output signal of the amplifier circuit 33.

In the drawing, (a) shows a trigger signal indicating start of an edge sensed signal and (b), (c), (d), and (e) show the edge sensed signals in various cases. In the edge sensed signal, there are indicated voltage outputs corresponding to the photosensor elements of the line image sensor 31 which are subjected to the light, while those not subjected to the light output 0 V.

The sensed signal in FIG. 8 (b) shows the signal obtained from the amplifier circuit 33 in the case where the edge of the electrostatic recording paper 4 is located in the normal position.

In FIG. 8, $n_1$ indicates that the edge of the electrostatic recording paper 4 is located in the position corresponding to the $n_1$-th element of the line image sensor 31 from one end thereof (e.g., on the right-hand side of the electrostatic recording paper 4 in the direction of transport when it is recorded).

When the edge sensed signal from the line image sensor 31 becomes as shown in FIG. 8 (c), it indicates that the electrostatic recording paper 4 is shifted, to the left from the direction of transport when it is recorded, by the distance corresponding to $(n_2-n_1)$ photosensor elements of the line image sensor 31. If it is assumed here that the pitch of the photosensor elements of the line image sensor 31 is equal to the pitch of the picture elements, it is indicated by the above signal that the edge of the electrostatic recording paper 4 is shifted by the distance corresponding to $(n_2-n_1)$ picture elements.

Likewise, the signals shown in FIGS. 8 (d) and (e) correspond to the cases where the edge of the electrostatic recording paper 4 is shifted by $(n_2-n_1)$ and $(n_3-n_1)$, respectively.

The alignment of the electrostatic recording paper 4 in the direction perpendicular to the transported direction of the electrostatic recording paper 4 in response to the above described edge sensed signal is described in the following.

Figure 9:
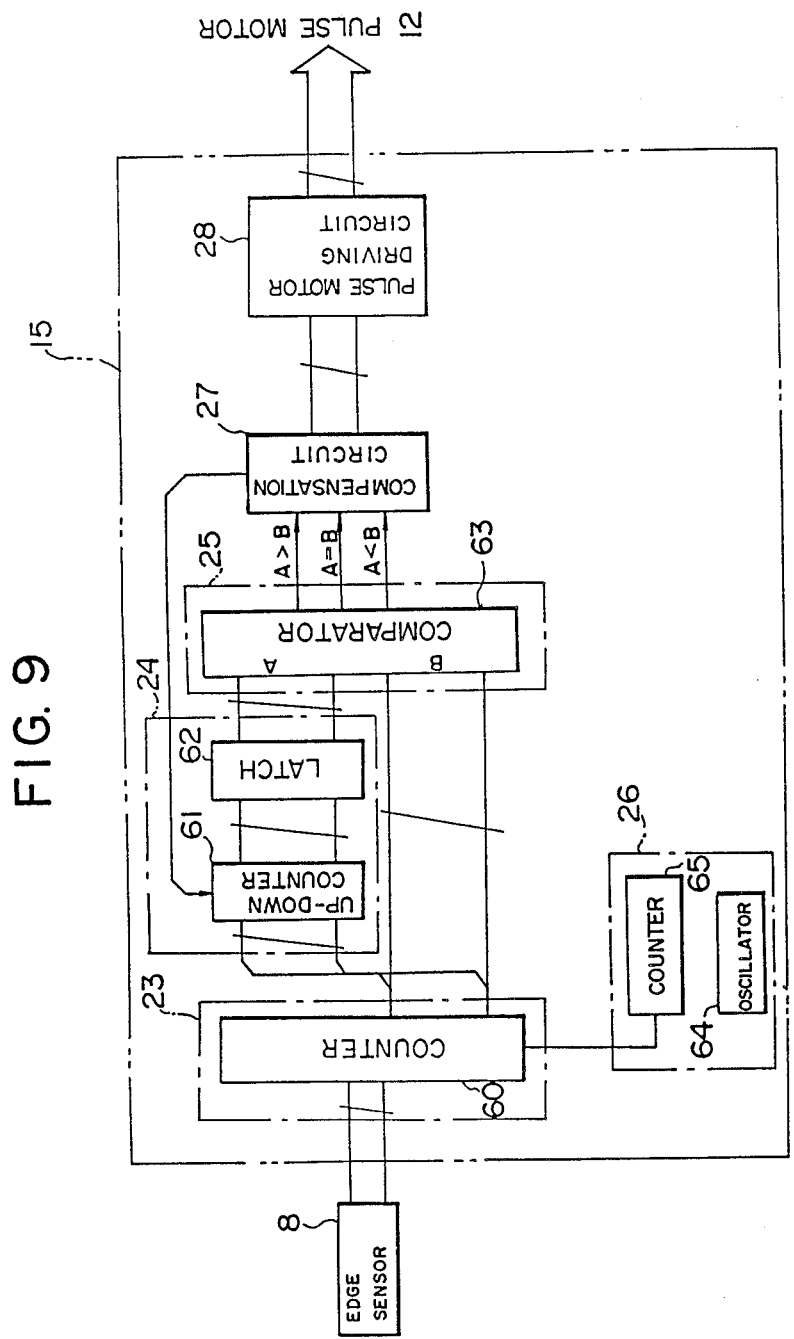
FIG. 9 is a block diagram showing a translation control circuit.
Figure 10A:
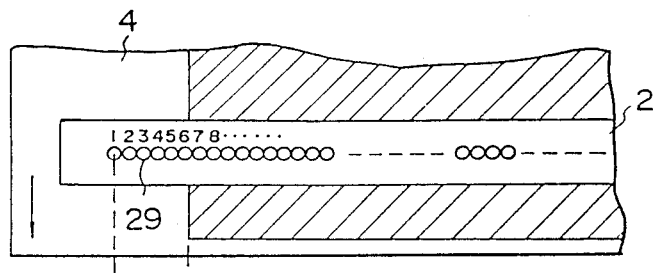
FIGS. 10 (a, (b), (c) and (d) show the positional relationships between the electrostatic recording paper and the recording head.
Figure 10B:
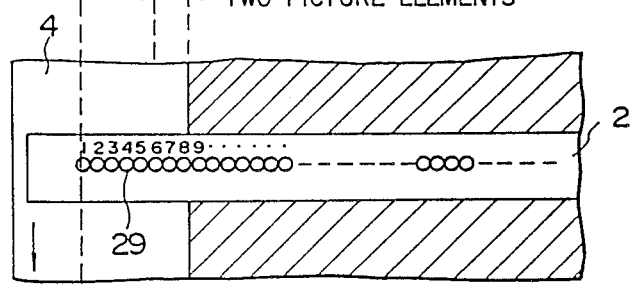
Figure 10C:
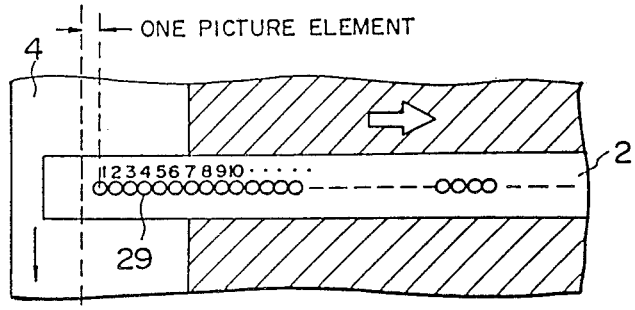
Figure 10D:
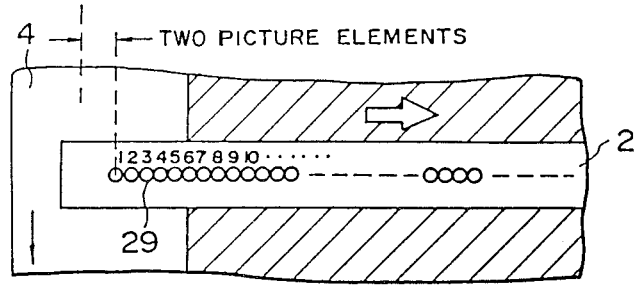

Referring to FIG. 9, the edge sensed signal from the amplifier circuit 33 of the edge sensor 8 is sent to a counter 60 of a counter circuit 23 and, at a predetermined period in synchronism with a compensation timing signal from a compensation period generator circuit 26, measures the position where the edge of the electrostatic recording paper 4 passes (i.e., at what numbered picture element position of the line image sensor 31 the edge is located).

In a bit retaining circuit 24, there are an up-down counter 61, storing therein a parameter indicating the positional relationship between the electrostatic recording paper 4 and the recording head 2, and a latch 62 outputting the parameter. In a comparator circuit 25, there is a comparator 63 which compares the edge position signal ($n_1$, $n_2$, $n_3$ of FIGS. 8 (b), (c), (d), and (e)) with the parameter stored in the bit retaining circuit 24 and outputs information about the shifted direction of the electrostatic recording paper 4 from the reference position. A compensation circuit 27, on one hand, outputs a control signal to a pulse motor driving circuit 28 for controlling the pulse motor 12 of the recording head translation device 11, which gives translation (as indicated by the arrows C in FIG. 1) to the recording head 2, to compensate the position of the picture image, and, on the other hand, sets a parameter indicating a new positional relationship between edge of the electrostatic recording paper 4 and the recording head 2 after the compensation in the bit retaining circuit 24.

The operations for the compensation is described in more detail in the following.

The electrostatic recording paper 4, on which the recording of the registration marks 9 has been finished, is returned to the original position in order that a black picture image is recorded thereon.

While the alignment of the electrostatic recording paper 4 in the direction of transport is conducted through sensing of the registration marks 9, an edge sensed signal as shown in FIG. 8 (b) is counted by the counter circuit 23 responding to the first timing pulse output from the compensation period generator circuit 26 made up of an oscillator 64 and a counter 65, whereby the position $n_1$ where the edge of the electrostatic recording paper 4 passes the line image sensor 31 is obtained. The position $n_1$ where the edge has passed is retained in the bit retaining circuit 24 as the initial parameter. The positional relationship between the electrostatic recording paper 4 and the recording head 2 at this time is as indicated in FIG. 10 (a). That is, the picture image is being recorded by the sixth needle electrode 29 from the left-hand end of the recording head 2 and those arranged to the right thereof (as indicated by oblique lines in the drawing). This state is taken as the reference thereafter, and whenever the electrostatic recording paper 4 has made a meandering movement, the recording head 2 is controlled through the recording head translating device so that the reference state is always maintained.

When the next timing pulse is output from the compensation period generator circuit 26, the edge sensed signal by the edge sensor 8 becomes as shown in FIG. 8 (c), when the counter circuit 23 measures $n_2$ and the positional relationship between the electrostatic recording paper 4 and the recording head 2 becomes as shown in FIG. 10 (b). The comparator circuit 25 obtains $n_2-n_1=2$, which means that, if the picture image is recorded in this state, the same will be shifted by the distance corresponding to two picture elements from the normal position, and it is detected that the edge of the electrostatic recording paper 4 is shifted to the left. Based on the above result of detection, the compensation circuit 27 provides the pulse motor driving circuit 28 with data to translate the recording head 2 by one picture element portion and data of the direction of translation. As the result, the recording head 2 is shifted, as shown in FIG. 10 (c), by one picture element portion in the direction indicated by the white arrow in the drawing. Thus, the picture image is displaced from the normal position just one picture element. Furthermore the bit retaining circuit 24 receives information from the compensation circuit 27 that the recording head 2 has been shifted by one picture element portion, whereby the up-down counter 61 counts up one count and changes the parameter to $(n_1+1)$. Then, if the edge sensed signal from the edge sensor 8 when the next timing pulse is generated is as shown in FIG. 8 (d), i.e., the same as that in FIG. 8 (c), the same control as described above is performed, whereby the recording head 2 is further shifted by one picture element portion in the direction indicated by the white arrow. As a result, the electrostatic recording paper 4 and the recording head 2 restore the normal state as indicated in FIG. 10 (d).

In the described manner, the edge of the electrostatic recording paper 4 is sensed at a predetermined period and constantly compared with the parameter, and when necessary, compensation is made by one picture element portion at one time of it so that the positional relationship between the electrostatic recording paper 4 and the recording head 2 may be brought into a predetermined state, and thus, the picture element of one color (black) is formed.

When a black picture image has been finished with the registration both in longitudinal and lateral directions of the electrostatic recording paper 4 conducted through sensing of the registration marks 9 formed on the electrostatic recording paper 4 and of the edge of the electrostatic recording paper 4, the electrostatic recording paper 4 is returned by means of the transport rollers 5, 6 in the direction indicated by the arrow B in FIG. 1. Thereupon, a liquid developing device 3b of another color (e.g., cyan) is set in the developing position, and thereafter, recording of a cyan picture image is carried out with the registration of the electrostatic recording paper 4 in the direction of transport controlled through sensing of the registration marks 9 and the alignment of the electrostatic recording paper 4 in the lateral direction controlled through sensing of the edge of the electrostatic recording paper 4 in the same way as in the case of the black picture image formation. When the cyan image has been recorded, magenta and yellow picture images are similarly recorded superimposed on one another, and thus, recording of a composite color image is completed.

Figure 11:
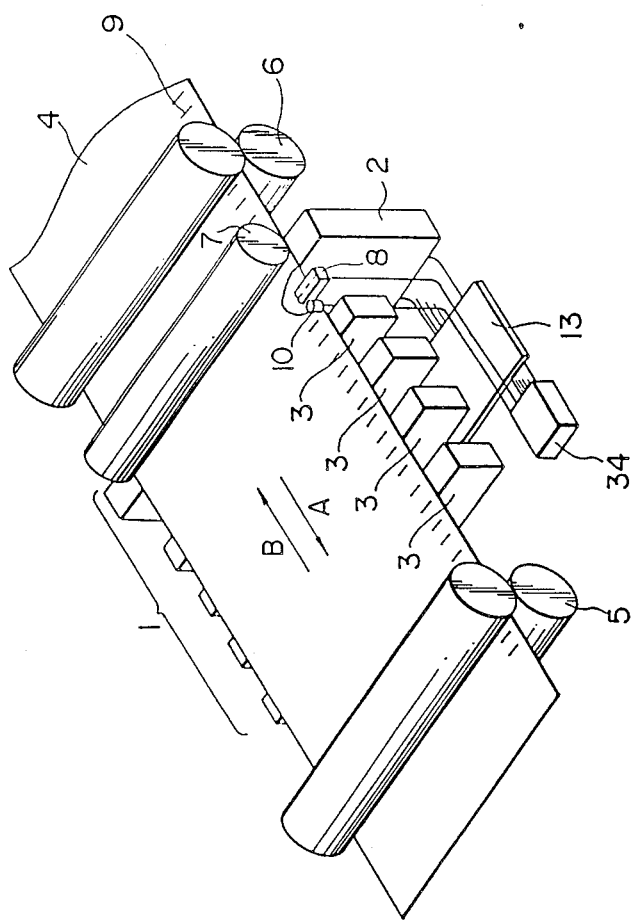
FIG. 11 is a drawing schematically showing structure of a color image recording apparatus according to a second embodiment of the present invention.

FIG. 11 schematically shows structure of a color image recording apparatus according to a second embodiment of the present invention, in which the same members as those in FIG. 1 showing the first embodiment are denoted by the same reference numerals. Referring to FIG. 11, reference numeral 1 denotes a recording portion, 2 denotes an electrostatic recording head, and 3a, 3b, 3c, and 3d denote liquid developing devices supplied with liquid developing agents of black, cyan, magenta, and yellow colors, respectively, and independently set in the developing position. Reference numeral 4 denotes electrostatic recording paper 4 pressed against the recording head 2 and transported by transport rollers 5, 6 through the recording portion 1 in the direction indicated by the arrow A or B. Reference numeral 8 denotes an edge sensor including a line image sensor provided for sensing an edge of the electrostatic recording paper 4, and 9 denote registration marks provided on the electrostatic recording paper 4 along its edge (for convenience' sake, the same are indicated on the upper surface of the electrostatic recording paper 4 in the drawing). Reference numeral 10 denotes a mark sensor for sensing the registration marks 9 passing by. Reference numeral 13 denotes a driving circuit for applying high tension pulses to the recording head and 34 denotes a picture signal control circuit for generating a recording timing period based on the measured value of the distance between the registration marks 9 by the mark sensor 10, detecting meandering movement of the electrostatic recording paper 4 based on the sensed signal by the edge sensor 8, and controlling the picture signal and compensating the position where the picture image is formed by the recording head 2. The point in which the present embodiment greatly differs from the first embodiment is that there is not provided the device for translating the recording head.

Also, in the apparatus of the present embodiment, the registration marks 9 are formed on the electrostatic recording paper 4 when the same passes through the recording portion 1 prior to recording of a picture image. When the registration marks 9 have been formed, the electrostatic recording paper 4 is returned by the transport rollers 5, 6 to the original position, and thereafter, a black image is formed. At this time, the registration marks 9 are sensed by the mark sensor 10 and the distance between the registration marks 9 is measured, whereby a recording timing signal is generated by an internal circuit (which is the same as the circuit indicated in the block diagram of FIG. 5) of the record control circuit 34 as indicated in a block diagram of FIG. 12 in the same way as in the case of the first embodiment and delivered to a recording signal compensation circuit 40. This recording signal compensation circuit 40 operates the driving circuit 13 in FIG. 11 for energizing the recording head 2 to form a latent image based on the above mentioned recording timing signal.

Figure 12:
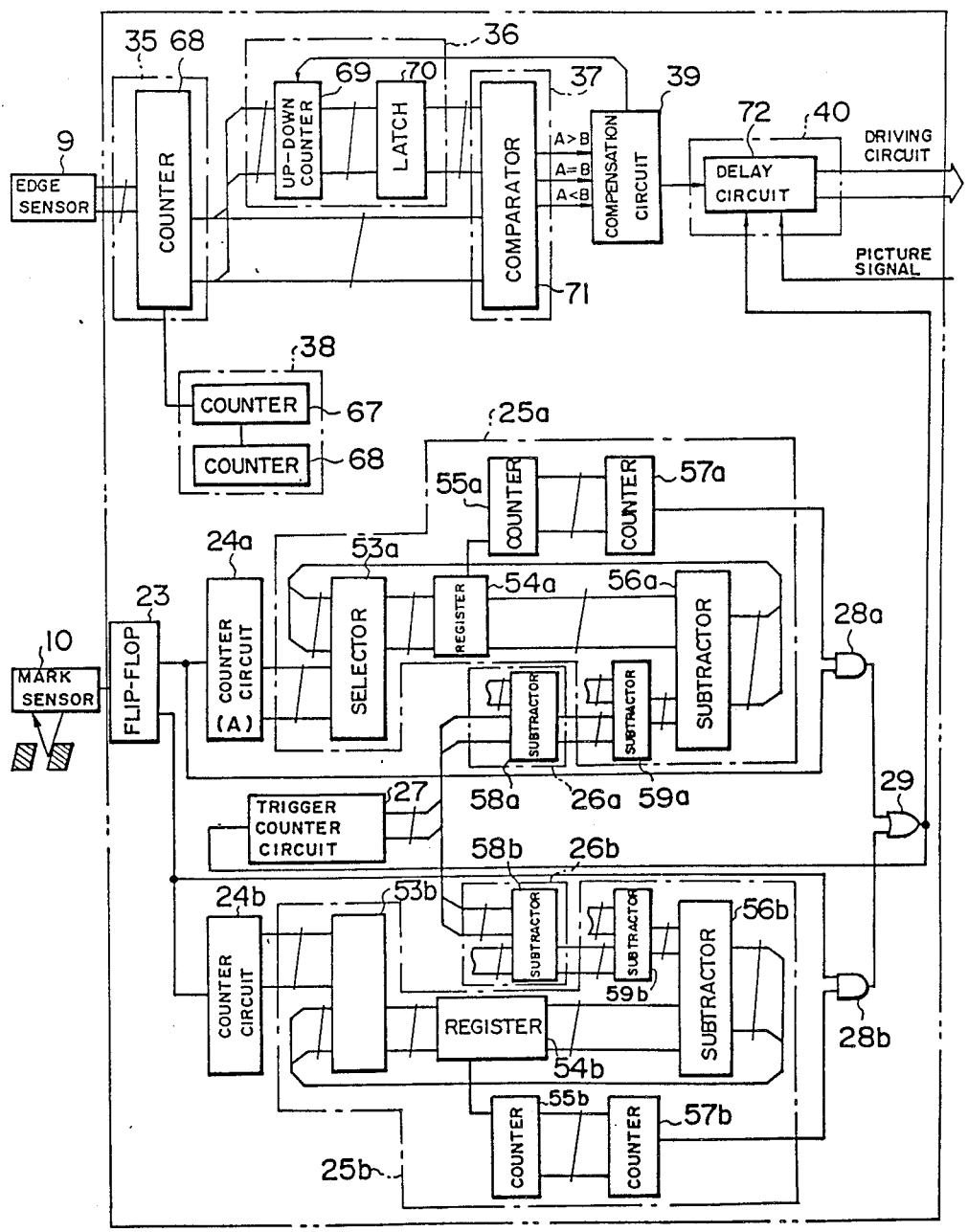
FIG. 12 is a block diagram showing a record control circuit used for the second embodiment of the present invention.

Further, an edge sensed signal (as shown in FIGS. 8 (a), (b), (c), (d) obtained by the edge sensor 8 as shown in FIG. 7 is delivered to a counter circuit denoted by reference numeral 35 in FIG. 12 made up of a counter 68 and put in synchronism with a signal from a compensation period generator circuit 38 comprising an oscillator 66 and a counter 67, whereby it is counted at what numbered photosensor element from one end of the line image sensor 31 the edge of the electrostatic recording paper 4 is located. A parameter indicating the positional relationship between the edge of the electrostatic recording paper 4 and the picture image is retained in a bit retaining circuit 36 made up of an up-down counter 69 and a latch 70. A comparator circuit 37 comprising a comparator 71 compares, in synchronism with the signal from the compensation period generator circuit 38, the information about the edge of the electrostatic recording paper 4 obtained by the counter circuit 35 with the parameter stored in the bit retaining circuit 36, and thereby outputs information as to the shifted direction of the edge of the electrostatic recording paper 4. This information about the shifted direction is delivered to a compensation circuit 39. This compensation circuit 39 supplies the recording signal compensation circuit 40 with data for compensating the picture signal enabling the picture image recorded by the recording head 2 to be shifted so that the picture image is always formed starting from the same position with reference to the edge of the electrostatic recording paper 4. The recording signal compensation circuit 40 controls, by means of a delay circuit 72 and according to the recording timing signal, the delay time of the picture signal relative to the recording timing signal, and thereby, produces a new picture signal for controlling the driving circuit 13 to align the picture image.

The method for the alignment in the lateral direction of the electrostatic recording paper 4 is described in more detail with reference to FIG. 8 in the following.

When a pulse signal is output from the compensation period generator circuit 38 after the registration mark 9 has been sensed by the mark sensor 10, assume that the edge sensed signal by the edge sensor 8 becomes as shown in FIG. 8 (b), the same as in the case of the first embodiment.

The signal of (b) is measured by the counter circuit 35 and the parameter $n_1$, indicating the edge of the electrostatic recording paper 4, is retained in the bit retaining circuit 36. FIG. 13 shows a picture-signal period signal (a), which is produced in synchronism with the recording timing signal, a picture signal clock (b), picture signals (c), (d), (e), and positional relationships between the recording head 2 and the electrostatic recording paper 4. First, when the signal of FIG. 8 (b) is measured, the relationship between the electrostatic recording paper 4 and the recording head 2 is as shown in FIG. 13 (f). At this time, the state of the picture signal relative to the picture signal clock of FIG. 13 (b) is as shown in FIG. 13 (c), i.e., the picture image is starting from the sixth clock of the picture signal clock (b). This means that the recording is made, as shown in FIG. 13 (f), by the needle electrode 41 in the sixth place from the left-hand end of the recording head 2 and other electrodes arranged to the right thereof. In this case, the distance between the end of the picture image and the edge of the electrostatic recording paper 4 is L. Therefore, the picture image is formed in this state until the next pulse signal is output from the compensation period generator circuit 38. When the next pulse signal is then output from the compensation period generator circuit 38, the counter circuit 35 takes in a new edge sensed signal. If it is assumed that the waveform at this time is as shown in FIG. 8 (c), then the counter circuit 35 obtains a measured value $n_2$. The subsequent comparator circuit 37 makes a comparison $(n_2 - n_1)$ between the parameter $n_1$ retained in the bit retaining circuit 36 and the newly obtained parameter $n_2$. In case of FIG. 8 (c), it is known that the electrostatic recording paper 4 is shifted by two picture element portions $(n_2 - n_1 = 2)$ to the right as shown in FIG. 13 (g). Hence, a signal indicating occurrence of the shift to the right is delivered from the comparator circuit 37 to the compensation circuit 39. The compensation circuit 39 in response to the signal from the comparator circuit 37 generates a signal to delay the picture signal by one picture element portion (one picture signal clock). (Conversely, in the case where, the electrostatic recording paper 4 is shifted to the left, a signal to advance the picture signal by one picture element portion is generated.) Responding to this signal, the record signal compensation circuit 40 delivers a signal, which is delayed by one picture element portion as shown in FIG. 13 (d), to the driving circuit 13. Consequently, the picture image is recorded starting from the seventh needle electrode 41 of the recording head 2 as shown in FIG. 13 (g). If the pitch of the needle electrodes 41 (the pitch of the picture elements) is represented by 1, since the first shift amount by 2 1 (two picture element portion) is compensated for by 1, the distance between the edge of the electrostatic recording paper 4 and the picture image becomes (L−1). Furthermore, the information that the picture signal has been compensated by one picture element portion is delivered from the compensation circuit 39 to the bit retaining circuit 36, whereby the parameter $n_1$ is increased by 1 (N1+1) and is stored therein as a new parameter.

When the next pulse signal is output from the compensation period generator circuit 38, the counter circuit 35 may measure an edge sensed signal as shown in FIG. 8 (d) from the edge sensor 8. Then, similarly to the previous case, the data $n_2$ indicating the position of the edge of the electrostatic recording paper 4 is obtained. The comparator circuit 37 compares this $n_2$ with the parameter $(n_1 + 1)$ from the bit retaining circuit 36 (i.e., $n_2 - n_1 - 1$). As a result, it is detected by the comparator circuit 37 that the edge of the electrostatic recording paper 4 is shifted to the right by one picture element portion. That is, the electrostatic recording paper 4 relative to the recording head 2 is in the state as shown in FIG. 13 (h). Therefore, the compensation circuit 39 receives the information indicating that there is present a shift to the right. Accordingly, a signal to delay the picture element by one picture element portion is generated again by the compensation circuit 39. In response to this signal, the recording signal compensation circuit 40 delivers to the driving circuit a picture signal which has been delayed further by one picture element portion (two picture element portion delayed as compared with the first state). Consequently, the recording is made from the eighth needle electrode 41 of the recording head 2 as shown in FIG. 13 (h). Thus, the distance between the edge of the electrostatic recording paper 4 and the picture image becomes L and the picture image is recorded in the normal position. On the other hand, the registration in the direction of transport of the electrostatic recording paper 4 is performed through control by the use of the circuit shown in the lower part of FIG. 12, which is identical to that of FIG. 5, in the same way as before.

By performing the above described control of each of the picture image recording repeated for different colors, a correctly registered color picture image can be obtained.

Although, in the above described first and second embodiments, the alignment control of the electrostatic recording paper 4 in the lateral direction produced by meandering movement of the electrostatic recording paper 4 or the like was made only at the time of recording each picture image on the electrostatic recording paper 4, it may also be made at the time the electrostatic recording paper 4 is returned to the original place. In order to reduce the total time required for the color image recording, the electrostatic recording paper 4, when it is returned to the original place, may be transported faster than when the image is recorded. In such a case, to shorten the period at which the lateral alignment control is made, i.e., to shorten the compensation repeating period generated by the compensation period generator circuits 26 and 38 of FIGS. 9 and 12, would be effective for improving the alignment accuracy.

Furthermore, while the compensation in the first and second embodiments, was made based on the value obtained by sensing the edge of the electrostatic recording paper 4, it would be effective in the case where linearity of the edge of the electrostatic recording paper 4 is not so good to make compensation taking the average value of the sensed values obtained at two or more continuously conducted sensing as the shift amount of the edge of the electrostatic recording paper 4.

Figure 8A:
FIG. 8(a) shows a trigger signal indicating the start of an edge sensed signal.
Figure 8B:
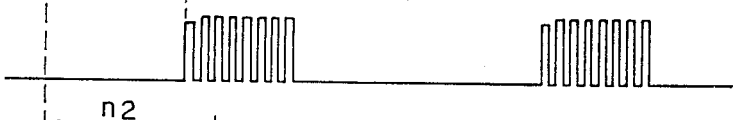
FIG. 8(b) shows the signal obtained from the amplifier circuit when the edge of the electrostatic paper is in the normal position.
Figure 8C:
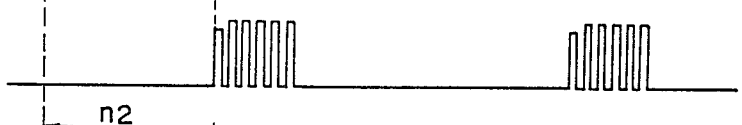
FIGS. 8(c), (d), and (e) show the signals obtained from the amplifier circuit when the edge of the electrostatic paper is shifted relative to the normal position.
Figure 8D:
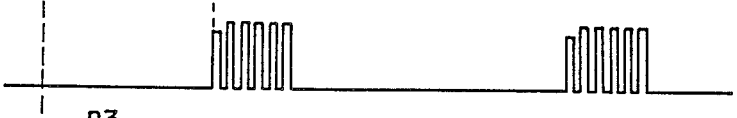
Figure 8E:
Figure 14:
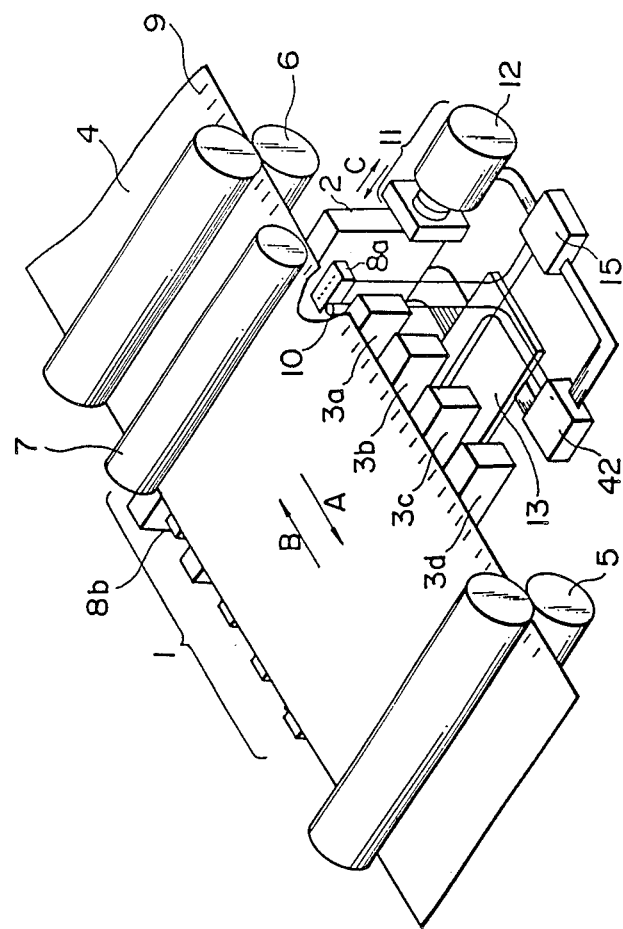
FIG. 14 is a drawing schematically showing structure of a color image recording apparatus according to a third embodiment of the present invention.

FIG. 14 shows a third embodiment of the present invention. Referring to FIG. 14, 8a and 8b denote edge sensors provided for sensing both edges, respectively, of the electrostatic recording paper 4, each thereof made up of a line image sensor formed of an array of linear photosensors packed to the density equal to or higher than the density of the picture elements. Otherwise, the structure is the same as the first embodiment and like members thereof to those in FIG. 1 are denoted by like reference numerals. In the embodiment of FIG. 14, when the electrostatic recording paper 4 passes through the recording portion 1 prior to recording of a picture image, the registration marks 9 formed along one edge thereof are turned into visual image by means of the liquid developing device 3a of black color. When the registration marks 9 have been formed, the electrostatic recording paper 4 is transported by the transport rollers 5, 6 in the direction as indicated by the arrow B to the original position. In succession thereto, in order that a black picture image is formed, the liquid developing device 3a of black color is set in the developing position and the electrostatic recording paper 4 is transported by the transport rollers 5, 6 in the direction as indicated by the arrow A.

Figure 15:
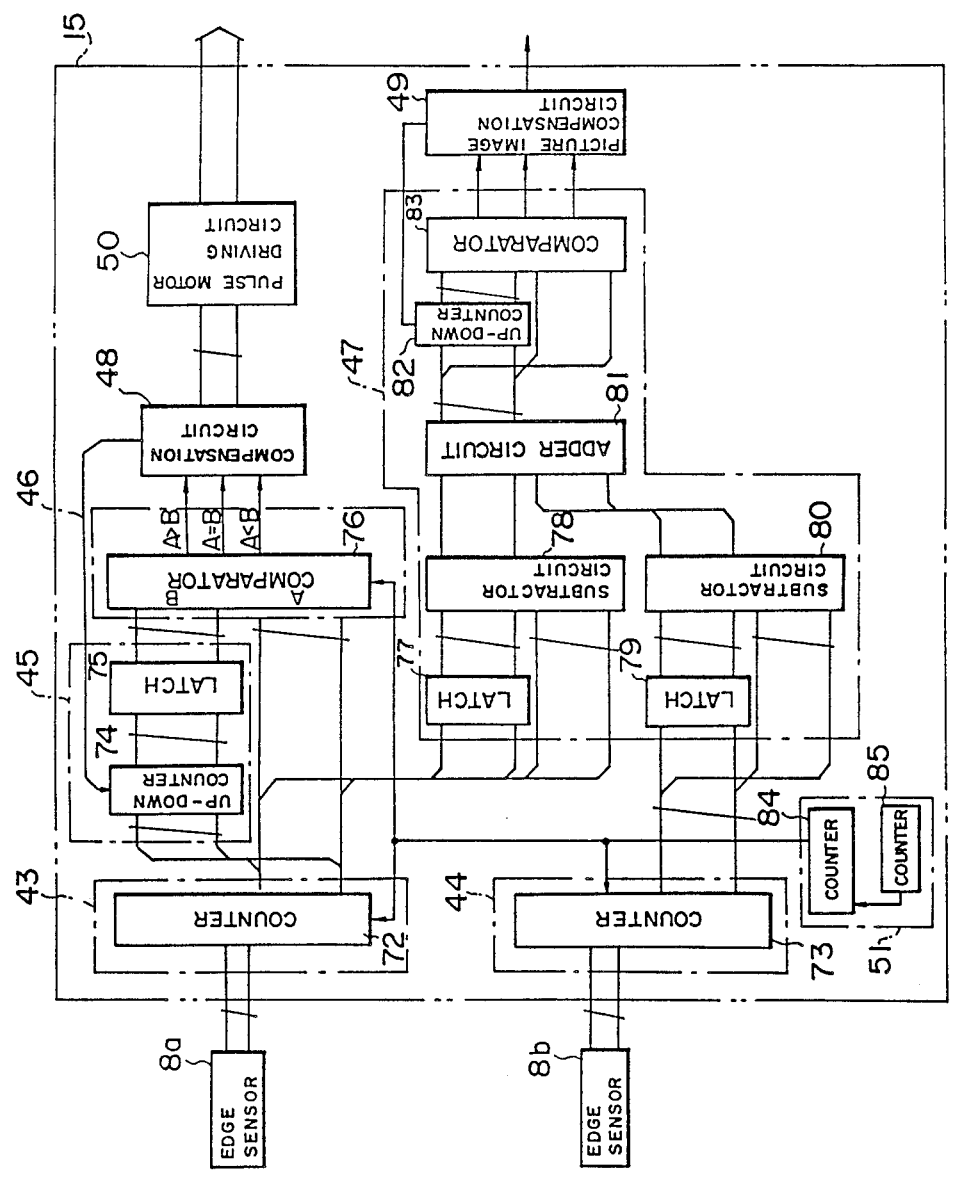
FIG. 15 is a block diagram showing a recording head control circuit used for the third embodiment of the present invention.

As it is transported, the registration marks 9 are sensed by the mark sensor 10. The image starts to be formed when the first registration mark 9 is sensed by the mark sensor 10. The method of controlling the registration in the direction of transport of the electrostatic recording paper 4 at this time through sensing the registration marks 9 while the recording timing signal is generated is the same as that in the first embodiment or the second embodiment. In addition to the sensing of the registration marks 9 by means of the mark sensor 10, both edges of the electrostatic recording paper 4 are sensed by the edge sensors 8a, 8b. The edge sensors 8a and 8b, as in the case of the first embodiment, output sensed signals of the edges of the electrostatic recording paper 4 to the translation control circuit 15. A counter circuit (A) 43 and a counter circuit (B) 44 shown in FIG. 15, which comprise counters 72 and 73, respectively, measure, in synchronism with a period signal from a compensation period generator circuit 51 made up of an oscillator 85 and a counter 84, the edges of the electrostatic recording paper 4 and numbers of the photosensor elements (corresponding to the numbers of picture elements in the case where the photosensor pitch is equal to the picture element pitch) from reference positions (the edges of the line image sensors of the edge sensors 8a and 8b in the present example). The edge sensed signal from the edge sensor 8a serves for detection of meandering movement of the electrostatic recording paper 4 by means of a bit retaining circuit 45 made up of an up-down counter 74 and a latch 75, a comparator circuit 46 comprising a comparator 76, and a compensation circuit 48, whereby the pulse motor 12 of the recording head translation apparatus 11 is controlled through a pulse motor driving circuit 50 so that the recording head 2 is translated, and thus, the alignment corresponding to the meandering movement of the electrostatic recording paper 4 (as well as the registration in the direction of transfer of the electrostatic recording paper 4) is performed in the same manner as in the case of the first embodiment. Furthermore, lateral expansion or shrinkage of the electrostatic recording paper 4 is detected by an expansion/shrinkage detection circuit 47 based on the measurement values of the left and right edges of the electrostatic recording paper 4 provided by the counter circuit (A) 43 and the counter circuit (B) 44.

Figure 16A:
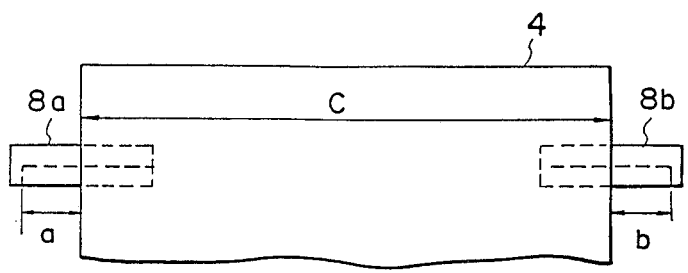
FIGS. 16 (a) and (b) show the positional relationship between the edge sensors and the electrostatic paper according to the third embodiment of the present invention.
Figure 16B:
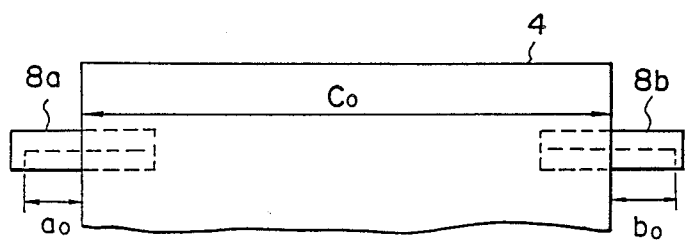
Figure 17:
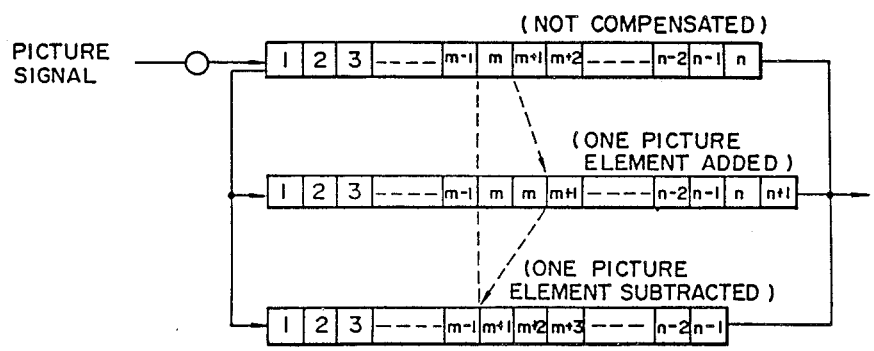
FIG. 17 is a drawing showing compensation of picture signals in the recording head control circuit.

According to information from the expansion/shrinkage detector circuit 47, a picture image compensation circuit 49 outputs a command to the recording head control circuit 42 to cause increase or decrease of one picture element in the picture signal for one line. Describing this operation in more detail, when, at the start, a first pulse signal is output from the compensation period generator circuit 51, measured values a and b as shown in FIG. 16 (a) are obtained according to edge sensed signals from the edge sensors 8a and 8b (, when it is assumed that the width of the electrostatic recording paper 4 is c). These measured values a and b are retained in latches 77 and 79 of the expansion/shrinkage detector circuit 47. The measurement for the second time is then made by the counter circuit (A) 43 and the counter circuit (B) 44 according to the next pulse signal from the compensation period generator circuit 51. If the measured values at this time are expressed by $a_0$ and $b_0$, then $(a+b)-(a_0+b_0)$ corresponds to the amount of expansion or shrinkage. And so, calculation for $(a-a_0)+(b-b_0)$ is carried out by the expansion/shrinkage detector circuit 47. That is, the subtraction of the measured value $a_0$ from the retained value a in the latch 77 is made by a subtractor circuit 78 and the subtraction of the measured value $b_0$ from the retained value b in the latch 79 is carried out in a subtractor circuit 80 and the results are added by an adder circuit 81. If the result is positive, the electrostatic recording paper 4 is detected to have shrunk, if it is negative, the same is detected to have expanded, and if it is zero, the electrostatic recording paper 4 is detected to have neither expanded nor shrunk by a comparator 83. The result of detection is delivered to the picture image compensation circuit 49, whereby the picture signal is controlled so that the recording head control circuit 42 may increase one picture element to the picture signal for one line when the electrostatic recording paper 4 is expanded, and decrease one picture element from the picture signal for one line when the electrostatic recording paper 4 is shrunk. The data about expansion or shrinkage of the recording medium is retained in an up-down counter 82 for subsequent comparison with the data about expansion or shrinkage for the following line.

FIG., 17 shows correction of the picture signal made in the recording head control circuit 42. Within the recording head control circuit 42, the incoming picture signal is temporarily stored in a picture signal memory circuit (not shown), when, if the electrostatic recording paper 4 is neither expanded nor shrunk, the signal is stored therein uncorrected. On the other hand, if the electrostatic recording paper 4 is expanded, an m-th picutre element is doubled, and if the electrostatic recording paper 4 is shrunk, an m-th picture element is dropped out, before the signal is stored in the picture signal memory circuit. And the thus expanded or shrunk picture signal is accordance with expansion or shrinkage of the electrostatic recording paper 4 is delivered to the driving circuit 13. Further, the result of compensation (increase or decrease of one picture element, or no correction, made in the picture signal) is fed back to the expansion/shrinkage detector circuit 47. Within the expansion/shrinkage detector circuit 47, the value (a+b), i.e., the sum of the initial values of the measured values by the counter circuit (A) 43 of the counter circuit (B) 44, is correct. That is, when the electrostatic recording paper 4 is expanded, 1 is added thereto, and if it is shrunk, 1 is substracted therefrom and this corrected values is set up as the new reference value. When the process for forming the black picture image has been finished with the above described controlling made during the process, the same operations are repeated in succession for superimposing cyan, magenta, and yellow images one on another, and thus a composite color image is obtained.

Figure 7B:
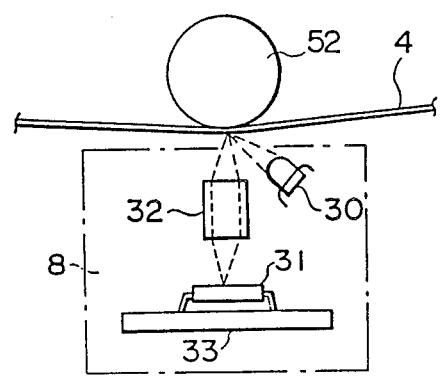

In the above described alignment corresponding to lateral expansion or shrinkage of the electrostatic recording paper 4, it can optionally be set up at what number position of the elements of the picture signal is to be added or dropped. In the case, for example, where the control in accordance with the meandering movement of the electrostatic recording paper 4 is made from the side on which the edge sensor 8a is installed as in the present example, a good result is obtained by establishing the positions of increase or decrease of the element of the picture signal at ⅔ or ½ width from the side where the edge sensor 8a is installed so that the positions of the added or dropped picture elements may become discrete, or discontinuous. Furthermore, in case of application to a plotter or the like, dropping out of printed dots, i.e., substantial disappearance of a fine line in the compensation for shrunk electrostatic recording paper 4 can be prevented by arranging so that the minimum line width, or the minimum picture element, may be printed by two picture elements. Furthermore, as previously made as additional remarks for the first embodiment or the second embodiment, when sensing the edge of the electrostatic recording paper 4 with the edge sensors 8a, 8b, it can be practiced to employ the average of a plurality of values which are measured continuously. Alternately, it is possible to make a virtual compensation through sensing the edges of the electrostatic recording paper 4 with the edge sensors 8a and 8b also when the electrostatic recording paper 4 is taken up in the direction indicated by the arrow B in the drawing by the transport rollers 5, 6 after each picture image has been recorded. Furthermore, in sensing the edge or edges of the electrostatic recording paper 4 with the edge sensor 8 or edge sensors 8a and 8b in the first, second, or third embodiment, it can be arranged so that the line image sensor 31 will sense the electrostatic recording paper 4 which is pressed against a stationarily or rotatably provided roller 52 blackened or similarly treated so as not to reflect light as shown in FIG. 7(b). Sensing errors due to vibration, floating, etc. of the recording paper can then be eliminated and accuracy in sensing the edge can thereby be improved. Although the registration marks 9 were provided only on one side of the electrostatic recording paper 4 in the above described first, second, and third embodiments, it is also possible, as in the conventional examples, to provide the marks on both sides of the electrostatic recording paper 4 so as to be sensed by left and right mark sensors arranged in the corresponding positions, and to make an alignment corresponding to oblique movement of the electrostatic recording paper 4 by slightly rotating the recording head 2 above the electrostatic recording paper 4 based upon the sensed information, and to combine this alignment with the above described registration.

What is claimed is:

1. In a color image recording apparatus for superimposing a plurality of images of different colors one on another to form a composite color image on a recording medium, said color image recording apparatus comprising:

latent image formation means provided in a path of transport of said recording medium;
   energization means for energizing said latent image formation means to form a latent image on said recording medium;
   a plurality of developing means supplied with different colors of developing agents for turning a latent image formed on said recording medium by said latent image formation means into a visual image;
   transport means for transporting said recording medium back and forth;
   timing control means for controlling said energization means at the time a latent image is formed on said recording medium by said latent image formation means;
   edge sensor means for sensing one edge or both edges of said recording medium while said recording medium is transported, said edge sensor means including a light source for illuminating said recording medium and a line image sensor;
   alignment means for controlling the position of a latent image formed by said latent image formation means on said recording medium according to result of sensing by said edge sensor meand; and
   sensor means for sensing state of transport of said recording medium.

2. The apparatus according to claim 1, wherein said edge sensor means includes a light source for illuminating a recording medium and a line image sensor, and wherein said recording medium, when its edge is sensed by said line image sensor based on incoming light thereto emitted from said light source and reflected by said recording medium, is placed on a member whose surface has a lower reflectivity than said recording medium.

3. The apparatus according to claim 1, wherein said edge sensor means includes a light source for illuminating a recording medium and a line image sensor, and wherein said recording medium, when its edge is sensed by said line image sensor, is placed on a roller provided for rotation.

4. In a color image recording apparatus for superimposing a plurality of images of different colors one on another to form a composite color image on a recording medium, said color image recording apparatus comprising:

latent image formation means provided in a path of transport of said recording medium;
   energization means for energizing said latent image formation means to form a latent image on said recording medium;
   a pluraltiy of developing means supplied with different colors of developing agents for turning a latent image formed on said recording medium by said latent image formation means into a visual image;
   transport means for transporting said recording medium back and forth;
   timing control means for controlling said energization means at the time a latent image is formed on said recording medium by said latent image formation meand;
   edge sensor means for sensing one edge or both edges of said recording medium while said recording medium is transported;
   alignment means for controlling the position of a latent image formed by said latent image formation means of said recording medium according to result of sensing by said edge sensor means;
   sensor means for sensing state of transport of said recording medium; and formation means of equally spaced apart registration marks for forming latent images therefor, by means of said latent image formation means and said energization means, along one edge or both edges of said recording medium outside an effective image plane as said recording medium passes through said latent image formation means, which latent images in succession thereto are turned into visual images through development in one color by said developing means; wherein said registration marks are sensed by said sensor means as a latent image is formed on said recording medium by said latent image formation means and, according to the sensed information, timing of said energization means is controlled, and at the same time, one edge or both edges of said recording medium is sensed by said edge sensor means and, according to the sensed information, said alignment means is controlled.

5. In a color image recording apparatus for superimposing a plurality of images of different colors one on another to form a composite color image on a recording medium, said color image recording apparatus comprising:

- latent image formation means provided in a path of transport of said recording medium;
- energization means for energizing said latent image formation means to form a latent image on said recording medium;
- a plurality of developing means supplied with different colors of developing agents for turning a latent image formed on said recording medium by said latent image formation means into a visual image;
- transport means for transporting said recording medium back and forth;
- timing control means for controlling said energization means at the time a latent image is formed on said recording medium by said latent image formation means;
- edge sensor means for sensing one edge or both edges of said recording medium while said recording medium is transported;
- alignment means for controlling the position of a latent image formed by said latent image formation means on said recording medium according to result of sensing by said edge sensor means; and
- sensor means for sensing state of transport of said recording medium; wherein deviations from a reference position of one edge or both edges of a recording medium are sensed by said edge sensor means at a predetermined period as information for correction and said alignment means is operated only when it is sensed that said information for correction indicates that the deviations from the reference position have successively occurred in the same direction.

6. The apparatus according to claim 5, wherein said alignment means is made up of a pulse motor for giving a lateral motion to a recording head in response to information as to the direction in which the edge of the recording medium is deviated.

7. The apparatus according to claim 5, wherein said alignment means in response to information as to the direction in which the edge of the recording medium is deviated causes the picture signal to be advanced or delayed by an optional number of picture elements so that the position of record may be changed.

8. The apparatus according to claim 5, wherein said alignment means gives a slight rotation to a recording head over a recording medium so that an alignment with a slant of the recording medium is performed.

9. In a color image recording apparatus for superimposing a plurality of images of different colors one on another to form a composite color image on a recording medium, said color image recording apparatus comprising:

- latent image formation means provided in a path of transport of said recording medium;
- energization means for energizing said latent image formation means to form a latent image on said recording medium;
- a plurality of developing means supplied with different colors of developing agents for turning a latent image formed on said recording medium by said latent image formation means into a visual image;
- transport means for transporting said recording medium back and forth;
- timing control means for controlling said energization means at the time a latent image is formed on said recording medium by said latent image formation means;
- edge sensor means for sensing one edge or both edges of said recording medium while said recording medium is transported;
- alignment means for controlling the position of a latent image formed by said latent image formation means on said recording medium according to result of sensing by said edge sensor means; and
- sensor means for sensing state of transport of said recording medium; wherein said alignment means is operated when said recording medium is transported backward by said transport means.

10. In a color image recording apparatus for superimposing a plurality of images of different colors one on another to form a composite color image on a recording medium said color image recording apparatus comprising:

- latent image formation means provided in a path of transport of said recording medium;
- energization means for energizing said latent image formation means to form a latent image on said recording medium;
- a plurality of developing means supplied with different colors of developing agents for turning a latent image formed on said recording medium by said latent image formation means into a visual image;
- transport means for transporting said recording medium back and forth;
- timing control means for controlling said energization means at the time a latent image is formed on said recording medium by said latent image formation means;
- alignment means for controlling the position of a latent image formed by said latent image formation means on said recording medium;
- sensor means for sensing state of transport of said recording medium; and
- formation means of equally spaced apart registration marks for forming latent images therefor, by means of said latent image formation means and said energization means, along one edge or both edges of said recording medium outside on effective image plane as said recording medium passes through said latent image formation means, which latent images in succession thereto are turned into visual images through development in one color by said developing means; wherein as said recording medium thereafter repeatedly passes through the latent image formation means, each of the pitches between said registration marks is measured by said sensor means and, at the same time, these steps are taken each time said registration mark is sensed to detect the discrepancy between the number of lines of the latent image formed up to the time when said registration mark is sensed and the number of lines established when said registration marks were formed in the beginning, to calculate, by means of said timing control means, the latent image formation period at which the latent image is to be formed in the next pitch between the registration marks from said value obtained by measuring the pitch between said registration marks and said discrepancy, and to control said energization means and said latent image formation means according to said latent image formation period.

11. The apparatus according to claim 10, wherein two measuring counters are used when the pitches between the registration marks are measured, so that the pitches between the registrations marks are alternately output therefrom.

12. The apparatus according to claim 10, wherein said registration marks are sensed in such a way that the registration marks recorded outside an effective image plane of said recording medium is illuminated by light and changes in the quantity of reflected light therefrom are sensed by a photosensor.

13. In a color image recording apparatus for superimposing a plurality of images of different colors one on another to form a composite color image on a recording medium, said color image recording apparatus comprising:
   latent image formation means provided in a path of transport of said recording medium;
   energization means for energizing said latent image formation means to form a latent image on said recording medium;
   a plurality of developing means supplied with different colors of developing agents for turning a latent image formed on said recording medium by said latent image formation means into a visual image;
   transport means for transporting said recording medium back and forth;
   timing control means for controlling said energization means at the time a latent image is formed on said recording medium by said latent image formation means;
   edge sensor means for sensing one edge or both edges of said recording medium while said recording medium is transported;
   alignment means for controlling the position of a latent image formed by said latent image formation means on said recording medium according to result of sensing by said edge sensor means; and
   sensor means for sensing state of transport of said recording medium; wherein deviations from a reference position of one edge or both edges of a recording medium are sensed by said edge sensor means at a predetermined period and said alignment means is adapted to be controlled only by a predetermined correction amount not exceeding the amount of the deviation.

14. In a color image recording apparatus for superimposing a plurality of images of different colors one on another to form a composite color image on a recording medium, said color image recording apparatus comprising:
   latent image formation means provided in a path of transport of said recording medium;
   energization means for energizing said latent image formation means to form a latent image on said recording medium;
   a plurality of developing means supplied with different colors of developing agents for turning a latent image formed on said recording medium by said latent image formation means into a visual image;
   transport means for transporting said recording medium back and forth;
   timing control means for controlling said energization means at the time a latent image is formed on said recording medium by said latent image formation means;
   a line image sensor for sensing the edge of said recording medium while the same is transported;
   alignment means for controlling the position of a latent image formed by said latent image formation means on said recording medium according to result of sensing by said line image sensor; and
   sensor means for sensing state of transport of said recording medium; wherein sensing density of said line image sensor is in agreement with picture element density of the record picture signal.

15. In a color image recording apparatus for superimposing a plurality of images of different colors one on another to form a composite color image on a recording medium, said color image recording apparatus comprising:
   latent image formation means provided in a path of transport of said recording medium;
   energization means for energizing said latent image formation means to form a latent image on said recording medium;
   a plurality of developing means supplied with different colors of developing agents for turning a latent image formed on said recording medium into a visual image;
   transport means for transporting said recording medium back and forth;
   timing control means for controlling said energization means at the time a latent image is formed on said recording medium by said latent image formation means;
   sensor means for sensing state of transport of said recording medium; and
   edge sensor means for sensing both edges of said recording medium while said recording medium is transported; wherein lateral expansion or shrinkage of said recording medium or meandering movement of the same is detected and also the picture signal is corrected based on the information obtained by said edge sensor means.

16. The apparatus according to claim 15, wherein said edge sensor means for sensing both edges of said recording medium is made up of two line image sensors disposed to face on both edges of recording paper.

17. In a color image recording apparatus for superimposing a plurality of images of different colors one on another to form a composite color image on a recording medium, said color image recording apparatus comprising:
   latent image formation means provided in a path of transport of said recording medium;

energization means for energizing said latent image formation means to form a latent image on said recording medium;

a plurality of developing means supplied with different colors of developing agents for turning a latent image formed on said recording medium into a visual image;

transport means for transporting said recording medium back and forth;

timing control means for controlling said energization means at the time a latent image is formed on said recording medium by said latent image formation means;

sensor means for sensing state of transport of said recording medium; and edge sensor means for sensing both edges of said recording medium while said recording medium is transported; wherein expansion or shrinkage of said recording medium is detected based on the sensed signal from said edge sensor means and it is adapted such that, when said recording medium is detected to be expanded, the number of picture elements in the picture signal for one line is increased and, when said recording medium is detected to be shrunk, the number of picture elements in the picture signal for one line is decreased.

18. The apparatus according to claim 17, wherein it is adapted such that, when expansion or shrinkage of said recording medium is detected, an optional picture element is the picture signal for one line is increased or decreased.

* * * * *